United States Patent

Vigh

[15] 3,636,792

[45] Jan. 25, 1972

[54] HERTZIAN STRESS-REDUCING MEANS FOR GEARS

[72] Inventor: Zoltan Vigh, 112 North Mar Vista Ave, Pasadena, Calif. 91906

[22] Filed: Sept. 5, 1969

[21] Appl. No.: 862,612

[52] U.S. Cl.................................................74/461, 74/411
[51] Int. Cl.................................F16h 55/14, F16h 57/00
[58] Field of Search..............74/461, 411, 243 PC, 440, 446, 74/441

[56] References Cited

UNITED STATES PATENTS

| | | | |
|---|---|---|---|
| 1,393,886 | 10/1921 | Doty | 74/443 X |
| 1,460,661 | 7/1923 | De Coninck | 74/461 |
| 1,772,986 | 8/1930 | Dunham | 74/461 |
| 2,335,504 | 11/1943 | Gazda | 74/461 X |
| 2,530,767 | 11/1950 | Hamill | 74/461 X |
| 3,173,301 | 3/1965 | Miller | 74/461 X |
| 3,304,795 | 2/1967 | Rouveral | 74/411 |
| 3,504,562 | 4/1970 | Hirych | 74/461 X |

*Primary Examiner*—Leonard H. Gerin
*Attorney*—Norman L. Chalfin

[57] ABSTRACT

Reduction in Hertzian and bending stresses in gears and in bearing assemblies is achieved by new configurations of gears and bearing assemblies employing combinations of materials in selected areas of the gears or bearing assemblies or cutting narrow slots into selected areas of the gear teeth or bearing assemblies. The increase in life of the gear or bearing assembly is expressed as $L_1 = cH/H_1 n$. For gears $n=6.5$ for bearings $n=9$. The Hertzian stress reduction provides in addition to increased operating life, higher reliability, higher load-carrying capacity and gears or bearings of quieter running characteristics at higher rotational rates than gears and bearings in the prior art.

9 Claims, 21 Drawing Figures

PATENTED JAN 25 1972 3,636,792

INVENTOR.
ZOLTAN VIGH

ZOLTAN VIGH
INVENTOR
BY
AGENT

HERTZIAN STRESS-REDUCING MEANS FOR GEARS

BACKGROUND OF THE INVENTION

In my U.S. Pat. No. 3,337,278 issued Aug. 22, 1967 entitled "HIGH SPEED ROLLER BEARING" I disclosed and claimed roller bearing elements and ball bearing elements of reduced weight including internal areas filled with relatively yieldable or compressible materials, or with bearings alternatively being hollow. Where roller bearing elements were disclosed they included end seals in the form of discs to prevent entrance of lubricants into the hollow areas of the interior or into the filled areas. It was shown in the above-identified patent how the reduction of mass and increased yieldability of the bearing surfaces increased their lifetime greatly.

THE PRESENT INVENTION

The present invention contemplates improvement upon the bearing devices of the earlier invention and is also applicable to gears as well. According to the present invention means are provided by which the failure of gears and bearing assemblies due to high contact and bending stresses can be substantially reduced and their life extended many fold where the stresses occur cyclically.

Contact stresses are called Hertzian stresses. Such stresses are experienced at the tooth-contacting surfaces in meshed or loaded gears. The material of the solid tooth under load at the contact area suffers local high-elastic compression and shear stresses. The residual plastic deformation might be higher than the limit of the material of which the gear is made. The same considerations apply to bearing assemblies.

According to this invention the gear teeth are modified so as to include means which provide a yieldability such that contact depth and Hertzian stress at the contact areas are reduced. As modified the gear teeth comprise what amounts to a coating and a yieldable core. The core then, suffers compression and shear stresses and the coating suffers mainly bending stress, and some compressional stress under load.

The modulus of elasticity of the core material is such as to be less than the modulus of the surface material. In one mode of making the combinational material gear of this invention well-known coating systems can be used such as diffusion of coating material, hard facing, or flame hardening, etc. Metallurgical compatibility between core and coating materials is necessary. Chromium, phosphates, nitrides and oxides, etc., can provide the hard surface materials on the gear since they have good thermal conductivity, can reduce friction, wear, oxidation heating and provide good corrosion resistance. The coatings should form a thickness of 15 to 20 percent of the gear tooth thickness at the pitch line.

As another mode of Hertzian stress reduction a slot can be cut into the gear tooth. The slot configuration can be selected from a number of alternatives to reduce concentrations of stress in the root radius area. Slotting can be achieved by high-energy and high-density laser beam or electron beam-cutting techniques to provide slot widths of from 0.00025 to 0.001 inch. The slot can be filled with an elastomeric material to reduce any likelihood of contamination.

The outer and inner ring structures of ball bearing assemblies can be made according to the invention by enclosing the bearing race with a yieldable material, or by making the materials of the rings and race undercut over a portion of their adjoining surfaces so that the opposed undercut areas, so to speak, breathe as the roller or ball roll within the assembly.

Slots can also be cut into the bearing assembly rings in such a manner that the stresses are relived and the life of the assemblies extended immeasurably.

As a further example of the combinational materials technique of this invention for Hertzian stress reduction coatings of resilient materials are provided on the inner and outer ball bearing race structures.

In yet another example of the stress relief techniques ball bearing assemblies have either outer or inner circumference crenelations which provide alternate contacting and noncontacting areas where the ball bearing race is inserted in its receptacle or positioned on its shaft.

DESCRIPTION OF THE EMBODIMENTS

Figure 1:
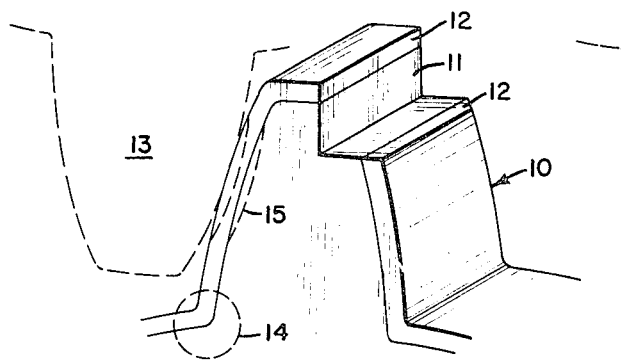
FIG. 1 illustrates a material combination gear tooth configuration according to this invention where a core and a coating are involved.
Figure 10:
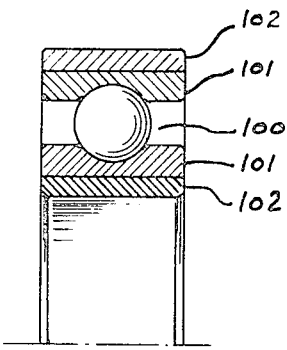
FIG. 10 is a section through a ball bearing inner and outer ring structure utilizing Hertzian stress reduction configurations according to this invention.
Figure 11:
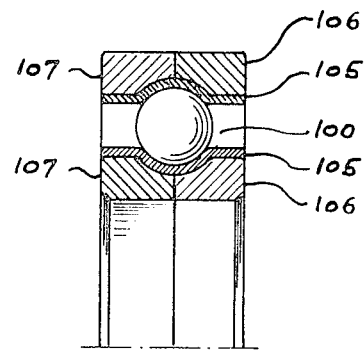
FIG. 11 is a section through a ball bearing assembly similar to that in FIG. 10 wherein another mode of assembly of the components thereof is shown.
Figure 12:
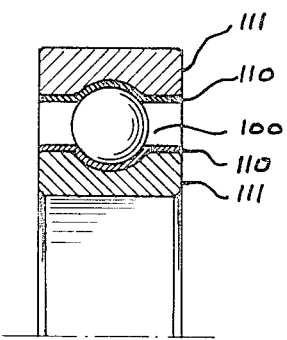
FIG. 12 is a section through a bearing assembly similar to that of FIG. 10 and 11 illustrating another form of application of the invention.
Figure 14:
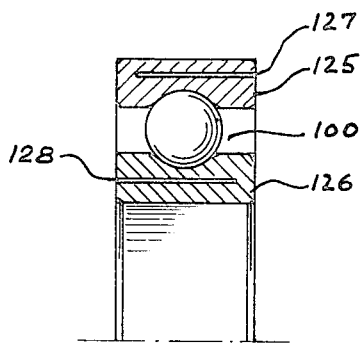
FIG. 14 is an illustration showing a cross section through a ball bearing assembly where a slotting technique is used for Hertzian stress reduction.
Figure 14A:
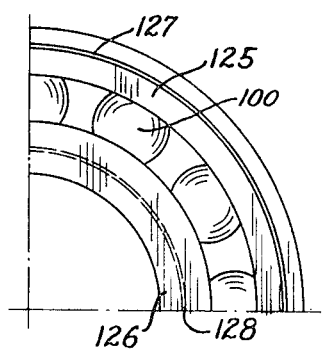
FIG. 14a is a side view of FIG. 14.

As has been described hereinabove the present invention contemplates the reduction of Hertzian Stress and contact and bending stress on the surface of gear teeth and bearing assemblies by modification of the structures of such gear teeth and ball or roller bearing assemblies. The reduction is accomplished in two alternative modes. One of the modes is as illustrated in FIG. 1 for gears employing a combination of materials. This mode is also illustrated in FIGS. 10, 11 and 12, and others for ball bearing assemblies. A second mode is to slot the structure of the gear tooth as in FIGS. 2–6. Slotted bearing assembly technique is illustrated in FIG. 14.

Referring now particularly to FIG. 1, a typical gear tooth 10 is shown with a portion of the point cut away to show how a tooth according to the invention is constructed utilizing combinational materials. The tooth comprises a core 11 over which there is a coating 12 of uniform thickness. The core 11 may be fabricated out of a material which has a modulus of elasticity less than that of the coating material 12. The coating material may be applied by any known technique such as diffusion, hard facing, flame hardening, etc. The material of the coating 12 may be any material compatible with the core 11 from a metallurgical standpoint. The coating may be such materials as chromium, phosphates, nitrides or oxides, etc., that produce a high-thermal conductivity, have good anticorrosion properties, and can reduce friction, wear, heating and oxidation. The thickness of the coating has been found to be best at from 15 to 20 percent of the thickness of the gear tooth 10. The core 11 may be of a metal such as aluminum or a nonmetallic material.

In FIG. 1 a dashed outline 13 is shown of a tooth in mesh with a tooth coated according to the invention (10). Were the elastic shell formed by coating 12 not present there would be no deformation, producing a stress at the root junction 14. But since the coating 12 bends, as indicated by dashed lines 15, into the core 11, which is yieldable relative to the coating 12, the stress at 14 does not occur, thereby increasing the life of the tooth, making it operable over many more cycles and at an increase in cyclic rate which would destroy conventional gear teeth in a relatively short time. The contact depth under load at the pitch diameter point (15) with the combinational material tooth of this invention is less than with a solid tooth giving rise to longer wear.

One of the factors which is responsible for wear in a solid tooth is the ultimate breakdown of lubrication due to compression against a nonyielding surface. When the elastic surface provided by the combinational materials 11,12 of this invention are employed the yielding surface provides a rolling path over which the lubricant can flow without being destroyed by the compressional forces.

In FIGS. 2–6 inclusive are shown a number of slotting configurations which can be applied to gear teeth for Hertzian stress reduction according to this invention. The slots are cut to a thickness of from 0.00025 to 0.001 inch To cut such fine slots modern laser and electron beam-cutting techniques are employed.

Figure 2:
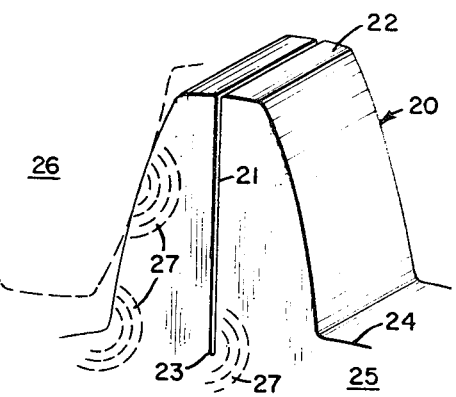
FIG. 2 is an illustration of a slotted tooth according to the invention wherein the slot is cut vertically down the center of the tooth.

In FIG. 2 a gear tooth 20 is shown with a vertical slot cut through the tooth between opposite faces of the gear. The slot 21 begins at point 22 of the gear tooth and extends downward to a predetermined depth 23 which may beat any point above or below the root diameter 24 of the gear 25. Thus the driving tooth 26 shown in dashed lines upon contacting tooth 20 will have its compressional force distributed throughout the gear as indicated by circular dashed lines 27.

Figure 3:
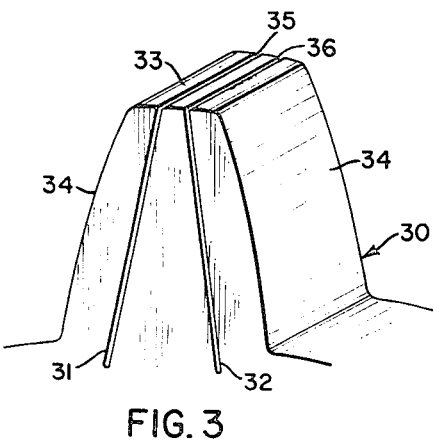
FIG. 3 is an illustration of an inverted V-shaped slotted gear tooth.

A pair of slots 31,32 are shown in FIG. 3 cut into a gear tooth 30 in the form of an inverted "V." The slots generally follow the contours of the flank and face 34 of gear tooth 30 starting from two adjacent positions 35,36 on the point 33 of tooth 30. The angle between the "V" components may be varied to suit different load conditions.

Figure 4:
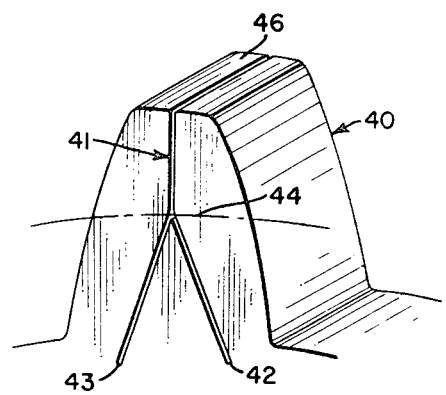
FIG. 4 is an illustration of a gear tooth according to the invention wherein the slot is in the shape of an inverted "Y"

An inverted "Y" shaped slot 41 is cut into tooth 40 as shown in FIG. 4. The diverging slots 42,43 of the "Y" may be varied in angle and their starting point on the tooth may be above or below the pitch diameter line 44 of tooth 40 to accommodate different loading conditions. The vertical slot of "Y" 41 extends to point 46.

Figure 5:
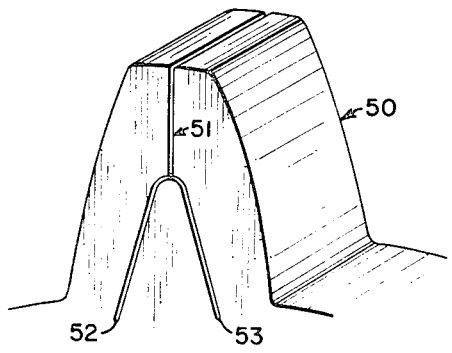
FIG. 5 is a variant of the gear of FIG. 4 with a slot in the form of an inverted "Y"

An alternative form of inverted "Y" slot 51 is shown in FIG. 5 where the diverging slots 52,53 in slot 51 tend to follow the tooth face contour to a greater degree.

Figure 6:
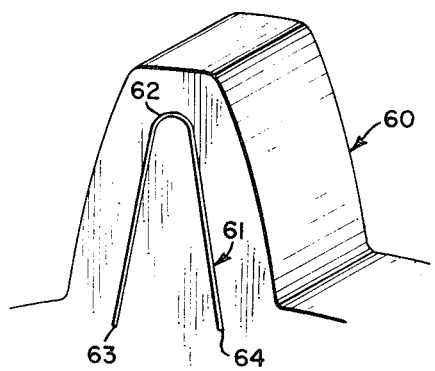
FIG. 6 is an illustration of an alternative form of the inverted "V" slot in a gear tooth wherein the slot follows the contour of the gear tooth.

An alternative inverted "V" configuration for slot 61 in tooth 60 is shown in FIG. 6. Slot 61 is cut so as to be entirely within the contour of gear tooth 60 having no edge exit on any part of the tooth. The configuration of slot 61 is like that of a bent hairpin within tooth 60. The stiffness of tooth 60 is determined by the diverging angle of slot ends 63,64 from bend 62.

The slotting configurations shown in FIGS. 2 through 6 are applicable to any type of gears, for example, spur, helical, bevel, spiral, hypoid, etc. The slots shown in the figures can have a variety of shapes by which Hertzian stress is reduced at the area of contact which is usually described as on the pitch circle. The area of contact is also usually described as having an ellipsoidal shape on the face of the gear tooth. The slots 21, 31, 32, 41, 51, and 61 can reduce the concentration of bending stress in the root radius area and results in a favorable load distribution at the critical sections of the gear. The slots may be filled with elastic material to protect them from contamination.

It has been previously mentioned that high energy and high-density laser beams or electron beam cutting may be used to cut the slots hereinabove described. In the cutting operation the high-kinetic energy is transformed into heat which on impact with the tooth causes rapid highly localized melting. This does not deform the gear because of the rapidity of action and its localized nature.

With either the combinational material form of gear tooth shown in FIG. 1, or with the slotted tooth gear configuration shown in FIGS. 2–6, the yieldability of the gear faces that results tends to equalize minor inaccuracies of tooth geometry and the overlapping of tooth motion is transmitted smoothly and quietly compared with gears not so treated as hereinabove described. The gears need not be so closely machined as is required for high-precision quiet running gears and accordingly will be less costly for operation with the equivalent results. The gears according to the above-described configurations absorb shock and vibration and compensate for machining error and mounting inaccuracies. The slotted gears of this invention provide corrective action across the full face width of the gear mesh equalizing the contact depth throughout the tooth surface so that perfect gear operation with high reliability and longer life can be assured.

As has been mentioned above in connection with the diverging slots 63,64 of "Y" slot 61 in FIG. 6, the diverging angle of the "V" slots 35,36 in FIG. 3, and 42,43 in FIG. 4 and the slots 52,53 may vary in angle for differing degrees of load and stiffness. The vertical slot 21 and 31,32, 42,43, and 52,53, 63,64 will produce greater or lesser tooth stiffness depending upon the depth to which they are cut into their respective teeth, 10, 20, 30, 40, 50, 60.

The reduction of Hertzian stresses by the design and configurations hereinabove described improves boundary lubrication because an elastic hydrodynamic film can develop to separate meshing surfaces. At the contact ellipse (see FIG. 7) the contact depth becomes smaller reducing shear stress. At the same time tooth wear is reduced because the load is gradually transferred from tooth to tooth with less sliding friction between teeth during engagement. This provides greater efficiency, longer life for a given load, and less noise in operation.

The gears which have been described hereinabove are configured to be yieldable when engaged by teeth of another gear. In one form the tooth of the gear is made of a combination of materials comprising a core having one modulus of elasticity and a coating on the core having a higher modulus of elasticity. The tooth is thus yieldable under Hertzian stress to reduce wear and noise and to increase gear life. In another form slots of thin cross section are cut into the tooth in various configurations making the surface yieldable under Hertzian or cyclic stress conditions.

Figure 7:
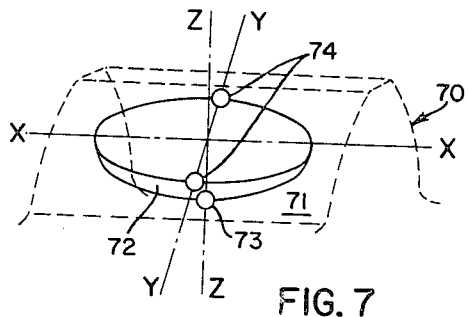
FIG. 7 is an explanatory diagram showing the contact ellipse area on a gear tooth.

In FIG. 7 the face 71 of a typical gear tooth 70 is shown. On face 71 is drawn the representation 72 of a contact ellipse at a point on the face of the tooth where Hertzian or compressional stress has occurred, depressing the surface to a maximum depth shown at 73. The points 74 of the contact ellipse are the points of maximum shear stress.

Figure 8:
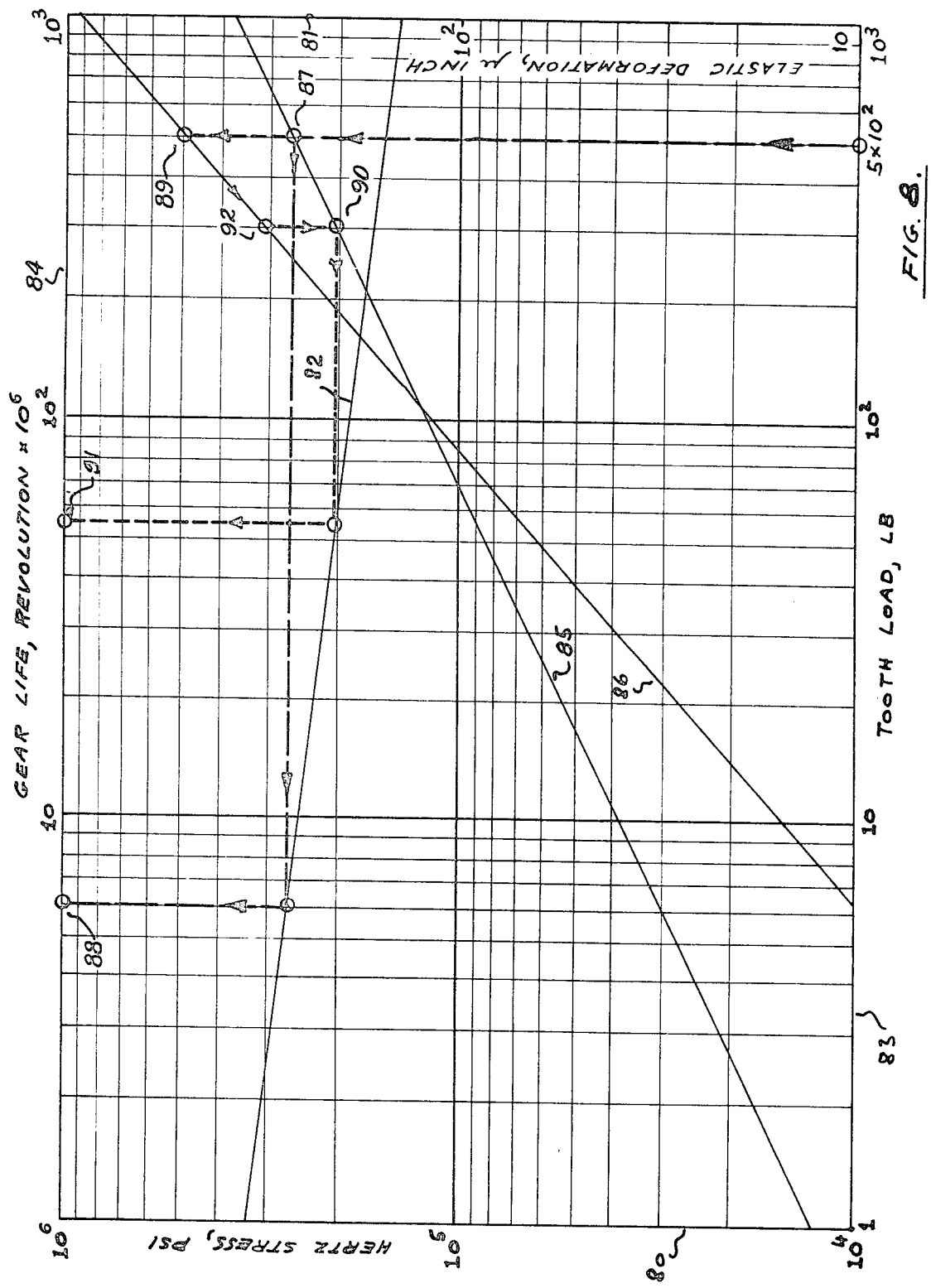
FIG. 8 is a graph of showing the solution for the dimensionless value of the life factor $L_1$ utilizing values of Hertzian stress and elastic deformation of the surface of a gear tooth.

In FIG. 8 a graph is shown of the solution of the formula for the dimensionless life factor $L_1$.

$$L_1 = c \, (H/H_1)^{8.5}$$

where $L$ is the gear life in revolutions $\times 10^6$ $c$ is a constant $H$ is a calculated Hertzian stress for a gear $H_1$ is the Hertzian stress reduction due to the combinational material or slotting technique of this invention applied to the gear.

The Hertzian stress values are expressed in p.s.i.

In the graph Hertzian stress values in p.s.i. are listed on the left ordinate 80. The elastic deformation (contact depth as illustrated in FIG. 7) is the scale on the right ordinate 81 in microinches. A line 82 plotted on the graph of FIG. 8 shows the empirical test curve for gears giving the actual life vs. contact stress derived by this inventor from data appearing in current gear literature. Gear life is represented in line 82 in revolutions.

The lower abscissa 83 of the graph in FIG. 8 is the load on a single tooth of a gear represented in lbs. The upper abscissa 84 of the graph is gear life in revolutions x $10^6$. The curve 85 on the graph is the result of a single calculation for one gear made under varying load conditions. The curve 86 is the result of a calculation for the same gear for which the curve 85 was drawn to show the elastic deformation of the contact area under load as was shown in FIG. 7.

For a gear with one tooth on which is impressed a load of 500 lbs. (see point 87 on curve 85 of the graph of FIG. 8) the gear life will be $6 \times 10^6$ revolutions, as seen at point 88 on the upper abscissa line 84, and an elastic deformation of 500 microinches (due to Hertzian stress) as indicated at 89 on curve 86 of FIG. 8. When the gear is treated with the combinational materials technique (FIG. 1) or any of the slotted tooth techniques (FIGS. 2–6) the elastic deformation is reduced to 320 microinches, as can be seen at 92 on curve 86 of FIG. 8. At a deformation depth of 500 microinches the Hertzian stress is 262,000 p.s.i. which is indicated at 87 on curve 85 of FIG. 8 while at an elastic deformation of only 320 microinches the Hertzian stress value is only 202,000 p.s.i. as indicated at 90 on curve 85.

From the formula for $L_1$ previously stated using the value of 1 for the constant $c$, $L_1 = 5.42$ (91, FIG. 8). The increased life of the gear according to this invention is therefore $6 \times 10^6$, $(L) \times 5.42$, $(L_1) = 32.52 \times 10^6$ revolutions.

Figure 9:
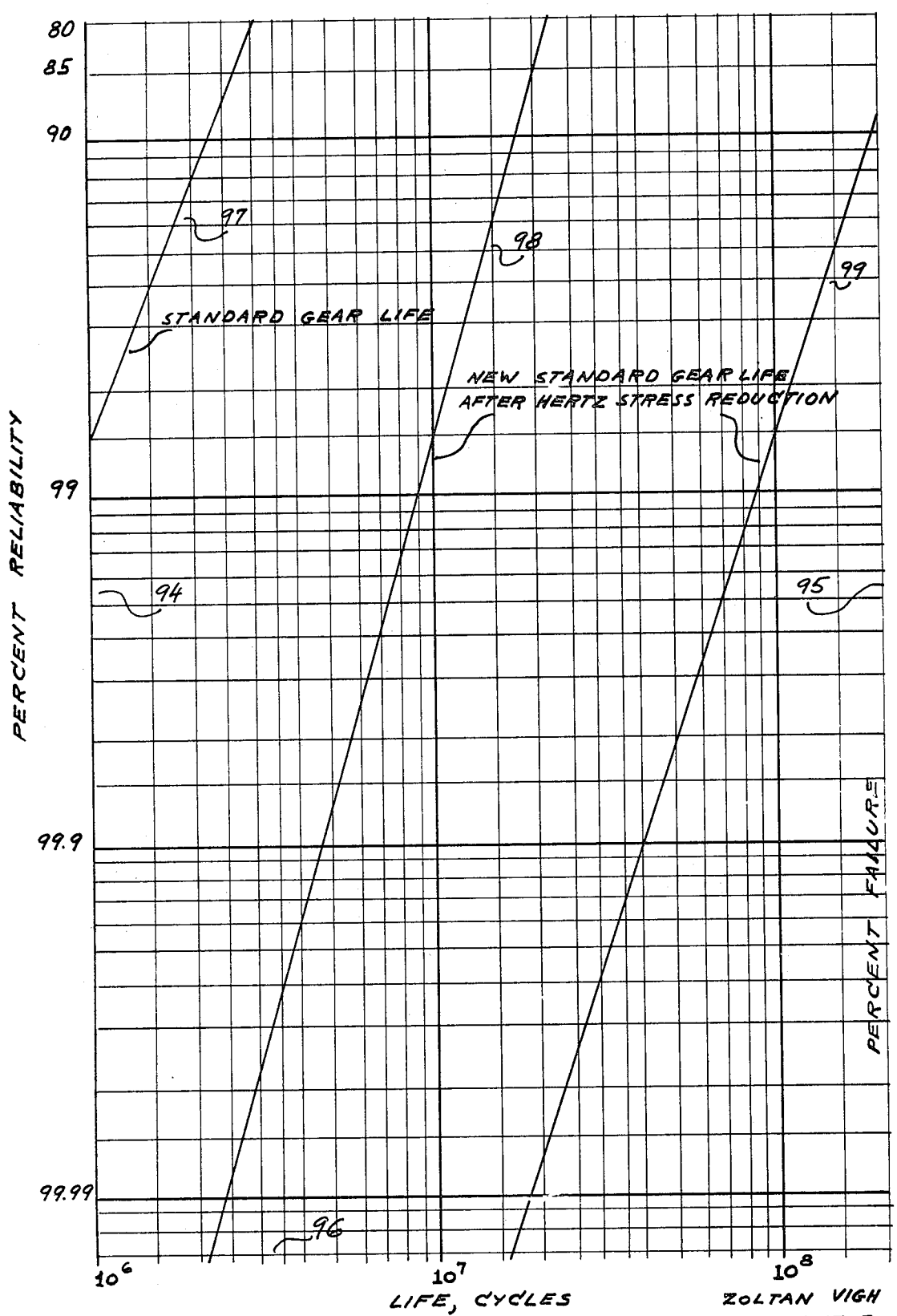
FIG. 9 is a graphic chart showing the comparative reliability of prior art gears and gears with teeth treated in accordance with this invention.

In FIG. 9 a chart is drawn showing the reliability of prior art gears compared with gears treated in accordance with the Hertzian stress reduction techniques of this invention. The left ordinate 94 lists the percent reliability of gears. The right ordinate shows the failure percentage of gears. The values on opposite ends of any horizontal line between the ordinates 94 and 95 can be seen to add to 100 percent. The lower abscissa 96 represents the number of revolutions of a gear at which failure can be expected. The curve 97 drawn on graph of FIG. 9 is a failure curve derived from a large number of tests of prior art gears. The curves 98 and 99 define the range within which the life expectancy of similar gears treated according to this invention for Hertzian stress reduction.

Hertzian stress reduction configurations are also feasible according to this invention for ball bearing assemblies. One such arrangement is shown in FIG. 10.

A ball bearing inner and outer ring structure are shown in FIG. 10 in section, wherein a solid ball 100 is installed in an inner ball bearing race 101 fabricated of a hard material, such as bearing steel. Surrounding the race 101 is a yieldable encasement 102 which may be of a metallic or nonmetallic material.

In FIG. 11 an inner and outer ring configuration similar to that shown in FIG. 10 is illustrated in section wherein the inner ring 105 has a two piece outer ring 106,107 pressfitted thereover. Outer rings 106,107 are of a yieldable material similar to that of encasement 102, in FIG. 10.

A bearing configuration similar to that in FIGS. 10 and 11 is shown in FIG. 12 wherein a hard coating race surface 110 is applied to the outer and inner ring surfaces 111.

Figure 13:
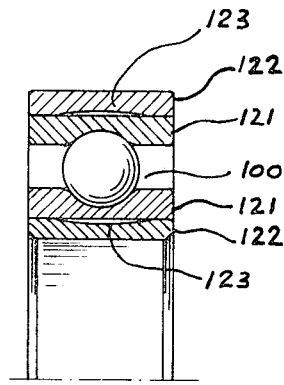
FIG. 13 is an illustration of the use of relief space as a Hertzian stress reduction means in a ball bearing assembly.

In FIG. 13 the ball 100 is surrounded by a pair of concentric rings 121,122 of identical material. However, there is an undercut relief space 123 between the two rings 121, 122 so that under load the rings 121 and 122 are yieldable.

It can be seen here that the bearing configurations shown in FIGS. 10–13 are so arranged that there is a yielding material somewhere to reduce the Hertzian stress. In FIGS. 10, 11 and 12 the yieldable materials 102, 111, 106, and 107 are different from (that is, softer than) the bearing race materials 101, 110 and 105. However, the materials of both race and ring in FIG. 13 are the same. Nevertheless in all the configurations yieldability is present under load.

The configurations of FIGS. 10 to 13 inclusive fall within the same combinational materials techniques described in connection with FIG. 1 for gears, where a yieldable core material has a surface coating with a lower modulus of elasticity that is in contact with the loading or driving surface.

FIG. 14 illustrates a slotting technique for Hertzian stress reduction by which a yieldable loading surface is achieved for ball or roller bearings. The inner and outer rings in FIG. 14 as seen at 125 and 126 are slotted as at 127 and 128. Slot 127 is cut into the ring from the left side. Slot 128 is cut from the right side. Neither slot goes completely through the ring into which it is cut. Not shown herein but a further extension of the technique illustrated in FIG. 14 is to cut alternate slots from either side into each ring such as 125 and 126. The degree of yieldability would be a function of the number of alternate slots cut into each ring.

Figure 15:
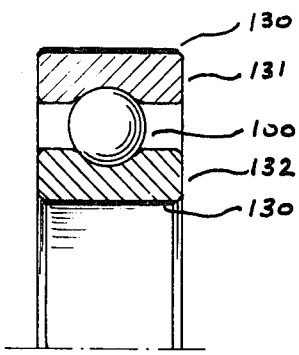
FIG. 15 illustrates the use of a resilient coating on the outer surfaces of a ball bearing assembly for Hertzian stress relief.

FIG. 15 illustrates the manner in which a resilient coating such as, for example, synthetic rubber as at 130 is deposited on the outer surfaces of the inner and outer rings 131,132 of the ball bearing race.

Figure 16:
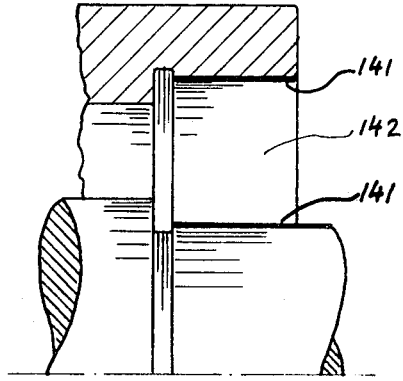
FIG. 16 illustrates an alternative means for the placement of yieldable material such as a resilient coating on the inner surfaces of a ball bearing receptacle.

In FIG. 16 an alternative to the yieldable material placement of FIG. 15 is shown wherein the resilient (yieldable) coating 141 is applied to the inner surfaces of a ball bearing race receptacle bore 142.

Figure 17:
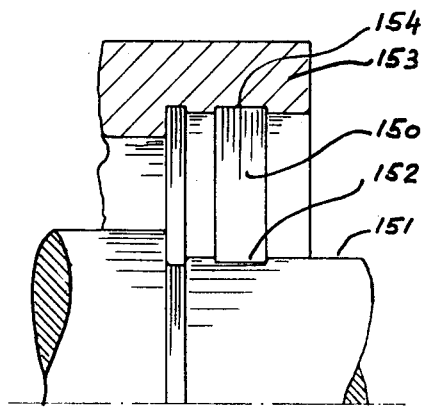
FIG. 17 is an illustration of the use of undercut relief areas in the shaft and housing of a ball bearing receptacle.

In FIG. 17 a ball bearing receptacle bore 150 is shown where the shaft 151 is undercut as at 152 and the housing 153 is undercut as at 154 so as to permit the yielding of rings of the bearing assembly under load when installed in receptacle 150.

Figure 18:
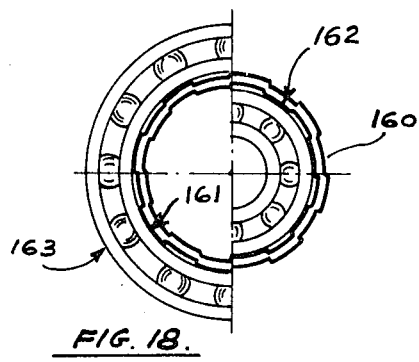
FIG. 18 is a composite drawing showing in one-half the use of an inner circumference crenelation on a ball bearing assembly, and in the other half an outer circumference crenelation for Hertz stress reduction according to the invention.

In FIG. 18 a composite drawing of half of each of two ball bearing assemblies is presented to show that either of the outer (160) or inner (161) circumferences of the assembly may be crenelated. Ball bearing assembly 163 fits over a shaft, or housing to permit inner surface 161 to yield under load. Assembly 162 fits within a housing or shaft permitting the outer crenelated surface 160 to yield under load.

Figure 19:
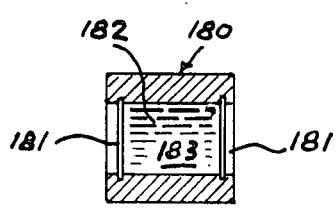
FIG. 19 is an illustration of the application of Hertz stress reduction to a roller.

In FIG. 19 there is shown another form of combinational material application of the Hertzian stress reduction technique of this invention, applied to a roller 180, on which bearings according to this invention can be installed. Within roller 180 end caps 181 are inserted sealably, at opposite ends. The caps 181 are of porous material so that substances such as a lubricant 183 may be disposed within the hollow area 182 of roller 180 and very slowly seep out through the pores of the caps 181 to lubricate the bearing races or assemblies installed on the rollers 180. By this means long storage of bearings can be achieved without need for constant relubrication thereof.

Figure 20:
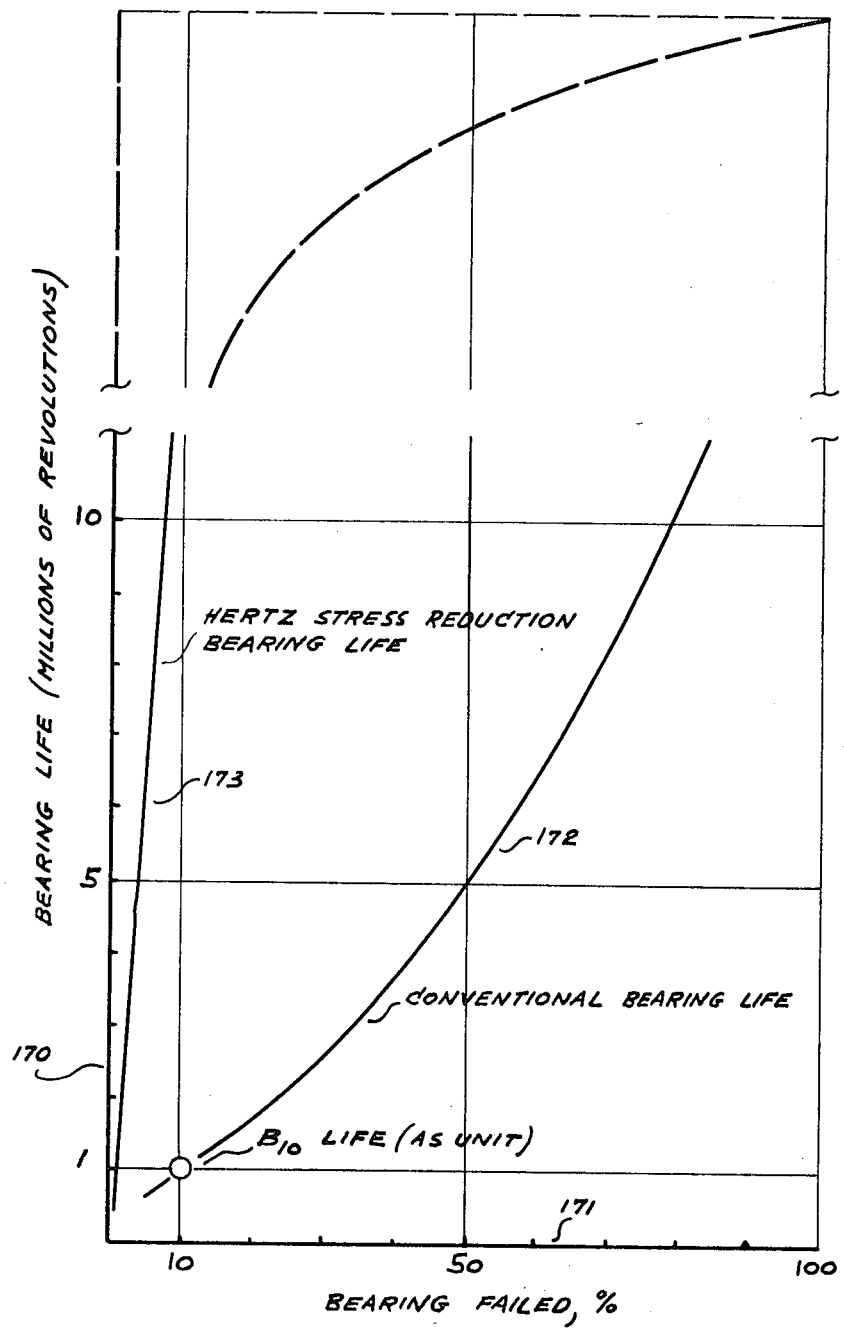
FIG. 20 is a graph to show the improvement in life expectancy through the use of Hertzian stress reduction techniques of this invention.

In FIG. 20 a graph is shown of the improvement in life expectancy for bearings using the techniques of Hertzian stress reduction hereinabove described for antifriction bearings. The ordinate 170 in the graph of FIG. 20 gives bearing life in millions of revolutions. The abscissa 171 is the percent of bearings failed. The curve 172 gives the life expectancy for conventional bearings of the prior art, as determined from a great many tests. The curve 173 shows the expected life of bearings after Hertzian stress treatment as disclosed hereinabove. For bearings the life expectancy formula is $$L_1 = c \, (H/H_1)^9.$$

It will be noted that this is the same formula as previously set forth for gears to which Hertzian stress reduction has been applied according to this invention, except that for bearings the exponent is larger. Accordingly the graph of FIG. 8 may be applied to ball and roller bearing structures so treated, except that the slopes of the curves will differ, being shallower.

Similarly the curves in the graph of FIG. 9 may be applied to bearings except that the slopes will be different.

What is claimed as new is:

1. In mechanical assemblies such as gears and bearings, means for reducing the Hertzian stresses thereon comprising: slots cut into said assemblies having cross sections on the order of 0.00025 inch to 0.001 inch in predetermined configurations, said slots being filled with an elastomeric material to protect them from contamination.

2. The slots defined in claim 1 being cut into said assemblies from opposite sides thereof.

3. The slots defined in claim 1 being cut into said assemblies in the form of an inverted "V."

4. The slots defined in claim 1 being cut into said assemblies in the form of an inverted "Y."

5. The slots defined in claim 1 being cut into said assemblies vertically.

6. In a gear, a gear tooth having slots cut into said tooth, said slots having a cross section of between 0.00025 and 0.001 inch and being filled with an elastomeric material to prevent contamination of said slot, whereby said gear tooth operates with reduced Hertzian stress and has increased wear and life expectancy.

7. In the gear tooth defined in claim 6 the configuration of said slot being in the form of an inverted "V."

8. In the gear tooth defined in claim 6 the configuration of said slot being in the form of an inverted "Y."

9. The gear tooth defined in claim 7 including a slot vertically cut into the tooth.

* * * * *

UNITED STATES PATENT OFFICE
CERTIFICATE OF CORRECTION

Patent No. 3,636,792          Dated January 25, 1972

Inventor(s) Zoltan Vigh

It is certified that error appears in the above-identified patent and that said Letters Patent are hereby corrected as shown below:

On the cover sheet [72] in the inventor's address, the zip code "91906" should read -- 91106 --.
In the Abstract the formula should read:

$$L_1 = c(H/H_1)^n$$

Signed and sealed this 12th day of December 1972.

(SEAL)
Attest:

EDWARD M. FLETCHER, JR.                ROBERT GOTTSCHALK
Attesting Officer                      Commissioner of Patents